United States Patent [19]

Francoeur et al.

[11] Patent Number: 5,169,589
[45] Date of Patent: Dec. 8, 1992

[54] PROCESS AND APPARATUS FOR DEFORMATION OF SOLID THERMOPLASTIC POLYMERS AND RELATED PRODUCTS

[75] Inventors: Jacques Francoeur, Nepean; Larry Morris, Edmonton, both of Canada

[73] Assignee: Symplastics Limited, Ontario, Canada

[21] Appl. No.: 722,189

[22] Filed: Jun. 27, 1991

Related U.S. Application Data

[63] Continuation-in-part of Ser. No. 544,395, Jun. 27, 1990, abandoned.

[51] Int. Cl.⁵ ............................................. B29C 47/82
[52] U.S. Cl. .................................. 264/323; 264/177.1
[58] Field of Search ............. 264/176.1, 177.1, 177.16, 264/177.17, 280, 288.4, 323

[56] References Cited

U.S. PATENT DOCUMENTS

| | | | |
|---|---|---|---|
| 3,443,007 | 5/1969 | Hardy | 264/321 |
| 3,874,837 | 4/1975 | Jamieson . | |
| 4,238,538 | 12/1980 | Manwiller . | |
| 4,266,919 | 5/1981 | Dunnington et al. | 425/102 |
| 4,789,514 | 12/1988 | Lo | 264/280 |
| 4,820,466 | 4/1989 | Zachariades | 262/119 |
| 4,877,393 | 10/1989 | Lo | 425/383 |

OTHER PUBLICATIONS

Research Disclosure 18661, "Process and Die for Extruding Profiled Articles for Fiber Polymer," Composites—Oct. 1979.
Bigg, Polymer Engineering and Science, vol. 28, pp. 830-841 (1988).

Primary Examiner—Leo B. Tentoni
Attorney, Agent, or Firm—Fitzpatrick, Cella, Harper & Scinto

[57] ABSTRACT

A process, apparatus and product related to extrusion or other deformation of solid thermoplastic polymers includes using a die or other deformation devices that have an interior passageway of changing cross-sectional shape commencing with an inlet of compact cross-section and ending with an outlet corresponding to the angular shape of the final extruded profile. The die passageway is divided into at least two consecutive stages including a first stage having an interior contour adapted to transform the polymer billet at a low deformation ratio into an intermediate cross-sectional shape proportional in shape to, but greater in cross-sectional area than, the final angular shape and a second stage having an interior contour adapted to transform the intermediate shape to the desired final shape with substantial longitudinal orientation of the polymer, but without substantial lateral shear deformation.

47 Claims, 5 Drawing Sheets

STAGE 1

STAGE 2

STAGE 1

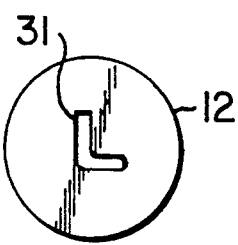 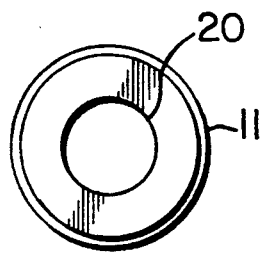 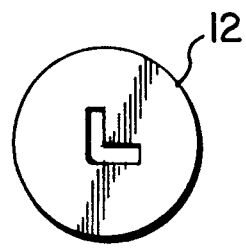
FIG. 5a  FIG. 6a  FIG. 7a
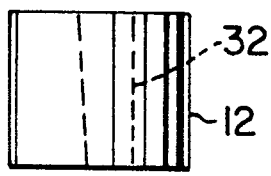  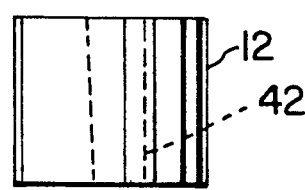
FIG. 5b  FIG. 6b  FIG. 7b
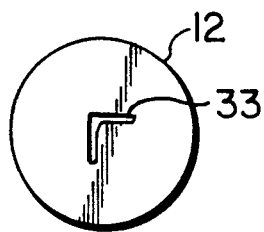 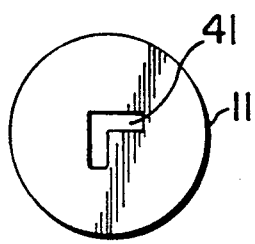 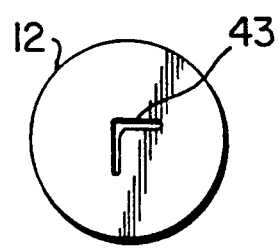
FIG. 5c  FIG. 6c  FIG. 7c
STAGE 2  STAGE 1  STAGE 2
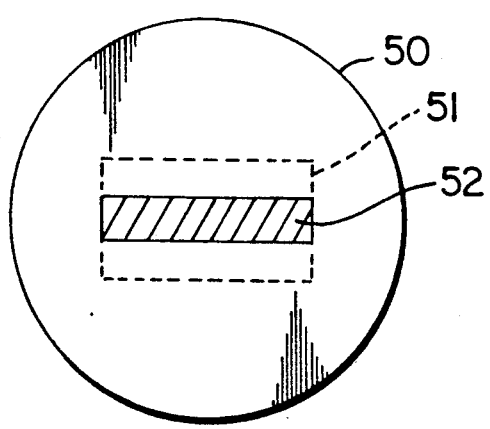 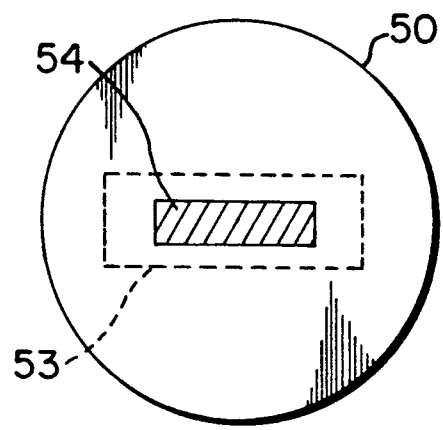
FIG. 8  FIG. 9

PROCESS AND APPARATUS FOR DEFORMATION OF SOLID THERMOPLASTIC POLYMERS AND RELATED PRODUCTS

This application is a continuation-in-part of abandoned U.S. application Ser. No. 07/544,395, filed June 27, 1990.

BACKGROUND OF THE INVENTION

1. Field of the Invention

This invention relates generally to a process and apparatus for solid state deformation of thermoplastic polymer billet shapes into angular shapes and to related products. One aspect of the invention relates to an extrusion die and process for extrusion of solid thermoplastic polymer billets into extruded angular shapes, preferably at high deformation rates.

Most polymers have a chain of carbon bonds along their backbone. Upon solidification of some polymers, a portion of the polymer chains in the material are folded to form crystals which are randomly oriented within the material. If even a small portion of the material behaves in this manner, the material is referred to as semi-crystalline. Such material may deform easily by bending, sliding and breaking of the crystals or a small fraction of the non-crystalline entangled molecular chains. If the chains are aligned or oriented, the mechanical strength is much improved. It is known that properties such as strength and stiffness are enhanced by aligning or orienting the polymer chains. One technique for orienting some polymers, such as polyethylene, is by plastic flow by solid state deformation at temperatures below the melting point.

Processes for the solid state deformation of polymers are well known. Among the processing techniques used to make profiles of polymers are ram and hydrostatic extrusion. In ram extrusion the billet of polymer is placed inside a usually cylindrical pressure chamber, so that the surface of the billet is in immediate contact with the walls of the chamber. One end of the chamber is fitted with a die, whose opening corresponds to the profile it is desired to produce. The other end of the pressure chamber is closed by an axially mobile ram, attached to a hydraulic system, so arranged that the ram pushes against the billet of the polymer and forces the polymer out from the chamber by flowing through the die.

In hydrostatic extrusion, the billet is much smaller than the pressure chamber, and the surface is separated by some distance from the chamber wall. The intervening space is filled with a hydraulic fluid. One end of the chamber is fitted with a pressure generated device, which may be a piston, or by an inlet through which hydraulic fluid is pumped into the chamber. The other end of the chamber is fitted with the die. One end of the billet is machined in such a way that the nose piece fits into the throat of the die, and makes a liquid tight seal. During extrusion, the pressure on the hydraulic fluid is increased. This pressure is transmitted in both the axial direction and the radial direction to the billet, so that it is pressurized equally in all directions. As a consequence, the surface of the billet is in contact with the oil, and some of this oil adheres to the surface of the billet as it passes through the die, providing a significant amount of lubrication.

During solid state deformation processes such as rolling, drawing and extrusion, the polymers lose the spherulitic or amorphous morphology generated during the cooling from the molten state, and become oriented usually in a longitudinal direction. The orientation of the polymer in a longitudinal direction increases the mechanical properties in the longitudinal direction of the polymer, e.g. its tensile strength and stiffness. These are sought after properties. One disadvantage of oriented polymers is that they are weak in the transverse direction and are subject to transverse cracking under stress.

In a process for forming a profile of substantially different cross-sectional shape than the polymer billet by extrusion through a die, the polymer is forced to undergo significant transverse flow at the same time as it is being oriented by longitudinal flow. In particular, the "transverse flow" as used herein means flow of polymer across a radial plane that contains the extrusion axis. If another form of deformation is used, transverse flow refers to flow of polymer across a radial plane that contains the deformation axis. Solid state deformation of a polymer profile shape usually takes place in one direction, and the deformation axis lies in that direction at the centroid of the cross-section or profile of the polymer shape being deformed. The shear stresses and strains generated during this transverse flow, particularly if the polymer is already oriented, result in the formation of cracks in the profile or to the generation of weak planes in the extruded profile that crack easily upon subsequent loading. The result is that when oriented polymer angular profiles of commercial interest, such as I-beams and channel sections, are extruded from cylindrical or rectangular polymer billets using conventional conical dies, serious flaws occur in the profiles, appearing as cracks or weak planes. These flaws become more severe in larger profiles (greater than about 1 $cm^2$ cross-section) having angular or asymmetrical cross-sections.

The weak plane can be characterized as an internal surface or a plane within the polymer shape with very few tie molecules bridging the polymer lying on either side of the surface or plane. As a result, the interface at this location is very weak, allowing the cracks to form.

The present invention is preferably used when obtaining highly oriented polymers of large cross-section at high extrusion rates. For polyethylene, polypropylene and many other polymers of this invention, an oriented polymer is obtained beginning at a deformation ratio of greater than 5, or preferably greater than 8, and most preferably greater than 10.

Deformation ratio, as used herein, means the ratio of the cross-sectional area of the polymer shape before deformation to the cross-sectional area of the polymer shape after deformation and orientation. In the processes of this invention deformation ratios of 5 to 30 are preferable, with those in the range above 8 being more preferred, and those in the range above 10 being most preferred. These ratios of 8 to 10 and above are high deformation ratios in polymers such as polyethylene, which means that the polymer has become highly oriented as a result of deformation.

As used herein, "highly oriented" refers to the morphology of a polymer shape. Polymer shapes after cooling from the molten state have spherulitic morphology. After substantial deformation in the solid state, these shapes have a fibrillar morphology. Fibrillar morphology differs from "fibrillation," which refers to a kind of material failure. Fibrillar morphology in the case of polyethylene of the molecular weights used in the examples of this application begins to appear at a deformation ratio of about 5, at which point the polymer begins to become oriented. Fibrillar morphology is obtained in polyethylene of the molecular weights of the examples herein at deformation ratios of 8 to 10 and above. Polymer shapes with such a non-spherulitic, or a fibrillar, morphology are called "highly oriented". The deformation ratio required to achieve a highly oriented polymer will vary with the particular polymer involved and its molecular weight.

2. Description of the Related Art

Much research work has been carried out on extruding polymers, such as high density polyethylene, while in the solid state, utilizing dies with converging inner faces to convert round billets into round rods or threads. Examples of extrusion dies that utilize two stages to make a non-round shape are shown in Lo U.S. Pat. Nos. 4,789,514 and 4,877,393. Those patents disclose a die in which the surfaces converge in a first lateral direction and diverge in a second lateral direction, and in which the polymer is made to flow in the required directions through the action of protrusions on the working surfaces of the die.

A two stage die is described in Research Disclosure 18661 "Process and Die for Extruding Profiled Articles for Fibre Polymer Composites," published in Research Disclosure—October 1979. However, in this case the first die stage has a cross-sectional area less than about 25% of that of the finished profile, while the second die stage has a cross-sectional area approximately equal to that of the finished profile, but has a shape proportional to that of the first stage. Upon passing through the second stage, the material experiences an area expansion of at least 4:1.

It is the object of the present invention to provide a process and apparatus for solid state polymer deformation of angular profile from cylindrical or prismatical shapes without the creation of weak planes or cracks in the angular profile.

SUMMARY OF THE INVENTION

According to the present invention, the above problem can be overcome by providing at least two distinct stages in the deformation or extrusion process. Thus, the invention in its broadest aspect relates to a deformation process and apparatus, such as an extrusion die for forming an extruded angular profile or oriented polymer from a billet of thermoplastic polymer material. The invention also relates to articles made using the process and the apparatus. In the case of extrusion, the novel die comprises an interior passageway of changing cross-sectional shape commencing with an inlet of an initial compact cross-section and progressing to an outlet corresponding to the angular shape of the final extruded profile. The term "compact" as used herein includes shapes that are elliptical, circular, polygonal, triangular, quadrilateral, hexagonal, octagonal, etc. Preferably, the aspect ratio of the compact shape is less than 5:1. The term "angular shape" as used in this specification and claims for the final product of this invention includes I-beams, C-channels, asymmetric rounded shapes, polygonal shapes with aspect ratios greater than 2, hollow shapes, complex branched shapes, right angle profiles, flat bars, etc. When speaking of deforming a given polymer shape from a compact shape to an angular shape, customarily the aspect ratio of the compact shape is less than that of the angular shape. The die passageway when using the present invention is divided into at least two consecutive stages including a first stage having an inner contour adapted to transform the polymer billet at a low deformation ratio into an intermediate cross-sectional shape proportional in shape to, but greater in cross-sectional area than, the final angular shape. "Proportional" is used herein not in the strict mathematical sense of being geometrically similar, but to mean a shape that approximates another in general profile. The cross-section or profile of the intermediate shapes of this invention are proportional to the cross-section or profile of the final, angular shapes but they are generally thicker and of greater cross-sectional area. A second stage of the die has an interior contour adapted to transform the intermediate shape to the desired final shape with substantial longitudinal orientation of the polymer, but without substantial lateral shear deformation.

Thus, in general terms, the process of this invention has two broad aspects. First it is desirable to keep flow of polymer across radial planes containing the extrusion axis to a minimum, particularly in portions of the shape that will be subjected to transverse stress in the final product. Second, to the extent that flow of polymer across the radial planes is necessary or desirable, that flow should take place before substantial longitudinal orientation has occurred—that is, while the polymer is in a state of low molecular orientation. These two aspects may be combined into a deformation process having two or more stages in which the polymer is first deformed with maximum flow across the radial planes that include the deformation axis into an intermediate shape that is proportional to the angular shape, and thereafter the intermediate shape is deformed into the angular shape with minimum flow across these planes. The invention also encompasses deforming the polymer to the intermediate shape with a minimum of longitudinal orientation, and then deforming the intermediate shape into the final angular shape with a maximum of longitudinal orientation.

In this invention the process and apparatus are designed to change a compact profile shape semi-crystalline thermoplastic polymer into an angular profile shape polymer in two or more stages. In the first or early stages, while the polymer possesses spherulitic morphology and before it becomes oriented, or highly oriented, and changed to have a fibrillar morphology, the amount of transverse flow approaches or is kept to a maximum. In the second or later stages, after the polymer has become oriented, or highly oriented, and obtained at least some fibrillar morphology, the amount of transverse flow approaches or is kept to a minimum. More transverse flow occurs while the polymer is unoriented and has a spherulitic morphology than occurs after the polymer is oriented, or highly oriented, and has a fibrillar morphology.

The resulting angular polymer product will show the results of how it was prepared. If a semi-crystalline thermoplastic polymer is deformed from a compact shape, such as round billet, to an angular shape, such as an I-beam, without regard to this invention, the angular shape may have transverse flow and longitudinal flow take place at approximately the same rate throughout the deformation process. If this occurs the resulting angular shape will possess weak planes and will crack or be likely to crack under transverse loading. Oriented angular polymer profiles of the present invention, however, have fewer weak planes, or less weakened planes, and consequently are stronger in the transverse direction, have greater load bearing capacity, and are less subject to transverse cracking under stress, than the same shapes produced as just described. That is, angular shapes produced by the invention may be made stronger than the same angular shape produced by a conical die. Conical dies have inner surfaces made up of straight lines that run from a point on the inlet of the die to a point on the outlet of the die. Utilizing the principles of this invention, it is also possible to design deformation stages to minimize weak planes in specific portions of an angular profile, and thereby to specifically engineer areas of strength into angular oriented shapes made from semi-crystalline thermoplastic polymers.

The objectives of a better and stronger angular profile may therefore be achieved by using a deformation process and designing the deformation apparatus to provide transverse flow of the polymer before it becomes oriented and while it still possesses spherulitic morphology. Depending on the properties desired in the final product, this transverse flow may deform the polymer into a shape that is proportional to the final shape to reduce weak planes approximately evenly throughout the angular shape. Alternatively, if it is desirable to minimize weak planes in a particular area of the angular shape, the transverse flow for the portion of shapes that will end up in that area should be kept to a minimum, and any transverse flow that must occur should be made to occur when longitudinal deformation of that portion of the polymer is at a minimum.

The process and the apparatus of the invention are preferably designed to approach essentially a practical maximum of polymer flow across the radial planes in the first or early stages, since other design and process criteria, such as the difficulty and cost of machining a die, the speed of extrusion, the force of extrusion, etc., may make it impractical or undesirable to reach the absolute maximum. Similarly, it is desirable when using this invention to design the apparatus and process to approach essentially a practical maximum of longitudinal orientation in the second or later stages, but other design and process factors may argue against use of the absolute maximum.

This invention includes a multistage process for solid state deformation of a rigid thermoplastic polymer having an initial compact profile shape into an angular profile shape. The compact shape may be deformed in at least two longitudinal stages, each having a longitudinal deformation axis and a deformation length. In a first stage, the compact shape is deformed into an intermediate profile shape that is proportional to the final angular shape but greater in cross-sectional area than the final shape. Deformation in the first stage is controlled so that the flow of polymer across radial planes containing the deformation axis approaches essentially a practical maximum. In a second stage the intermediate shape is deformed into the final angular shape and the deformation is controlled so that the flow of polymer across radial planes containing the deformation axis approaches essentially a practical minimum. The deformation in the first stage of this invention is preferably controlled so that a majority of the flow of polymer across radial planes containing the deformation axis occurs in the first stage. It is also preferable that a majority of the longitudinal orientation take place in the second stage.

In carrying out the present invention the deformation process may be controlled so that the flow of polymer across radial planes containing the deformation axis is greater in the first stage, and less in the second stage, than would occur with a conical die designed to produce the same final shape in the same length as the length of the first and second deformation stages combined. Similarly, the process may be controlled so that the change in radius of the first stage per unit length along the deformation axis is greater in the first stage, and smaller in the second stage, than would occur with a conical die designed to produce the same shape in the same length as the combined length of the two deformation stages. The deformation may also be controlled so that the deformation ratio is greater in the first stage and smaller in the second stage, then the deformation ratio in a conical die designed to produce the same shape in the same length as the combined length of the two deformation stages. The deformation may also be controlled so that the flow of longitudinally oriented polymer across radial planes is reduced relative to the flow of such polymer that would occur in a conical die designed to produce the same shape in the same deformation length.

Another feasible variation would be to use three or more stages in the die, rather than two stages. For most profiles, a two stage die is adequate, but three or more stages may be desirable for very complex profiles. In yet another variation, the first and second stages are not contiguous, but are located in different pieces, and are used in separate locations at separate times. In the first operation the billet is extruded through the first stage only to assume an intermediate shape, and at a later time on the same or on another machine fitted with the second stage and the die land, and another extrusion is performed to convert the intermediate shape to the final shape.

The nominal draw ratio (or extrusion or deformation ratio) is defined as the ratio of the area of the initial cross-section to the area of the final (or intermediate) cross-section.

The above procedure avoids the problem of the weak planes or cracking because in the transformation from the billet to the intermediate shape, substantially all transverse or lateral deformation occurs during a low state of molecular orientation. This is ensured by a very low draw ratio in the first state which is typically in the range of 0.5 to 15, preferably about 5.

In the second stage, where the polymer becomes significantly oriented, little transverse lateral transformation is required because the final shape has already been generally established in the first stage. The final profile can thus be formed simply by the thinning or shrinking of the intermediate shape without the necessity of lateral shear. Consequently, a high draw ratio can be used in the second stage sufficient to obtain longitudinal stretching for orientation without generation of weak planes and cracks. The second stage draw ratio is typically in the range of 2 to 30.

Because the first stage starts with an undeformed isotropic billet, the angle of taper of the first stage die interior passageway can be quite high, e.g. a semi-angle of 10° to 60°. The semi-angle is measured between the tapered side of the die and the line intersecting the taper. The second die stage preferably has a low angle of taper, e.g. a semi-angle of 1° to 20°, so that the strain rates are as low as possible.

For a conical die, the flow path is linear and the strain rate increases towards the die exit. A parabolic or streamlined die will produce a more uniform strain rate and allow faster extrusion speeds. However, dies that are curved in the longitudinal direction are difficult to fabricate. It is possible to increase the extrusion speed by making the present two stage die in several linear sections such that the angle of taper in the second stage decreases in two or more steps towards the die exit. Polishing the as-machined die to a better than one half micron Ra finish and rounding of corners also allows higher speeds and significantly reduces the extrusion pressure. Extrusion speeds of between 1 and 10 m/min for profiles of cross-sectional area greater than 1 cm$^2$ have been achieved with dies made according to the present teaching.

There are various procedural possibilities for carrying out the transformation from the billet to the final angular profile as follows:

1. According to one embodiment, the transformation through the die may be carried out at a constant aspect ratio (width to thickness ratio). Thus, in the first stage, the billet is transformed into an intermediate angular profile of substantial cross-sectional area and in the second stage the angular profile is reduced in cross-sectional area. However, the ratio of the width to thickness of the profile is maintained constant in the second stage so that there is little lateral shear strain, (i.e., transverse flow) in the second stage.

2. It is also possible to carry out the transformation with a balanced draw ratio. In this embodiment, the second die stage is so designed that all subsections of the angular profile receive nominally the same deformation ratio in the second stage. To accomplish this, in designing such a die, the complex shape of the extrudate is considered to be subdivided into subsections, each of which has a low aspect ratio. The intermediate shape is designed such that each of these subsections receives the same reduction in area between the intermediate and the final shape of the profile, i.e. have the same deformation ratio. Thus, there is once again very little lateral shear strain in the region of the angle.

3. In a third arrangement, the transformation is carried out with a constant arm length. Here, the length of the arms of the angular profile is the same in both the first and second stages, only the thickness of the profile is modified in the second stage. Accordingly, there is little lateral shear strain in the second stage of deformation.

In general, a proportional shrinkage in cross-sectional area from the intermediate shape to the final shape (i.e. maintaining a constant aspect ratio) is the most desirable die geometry but a simple reduction in thickness or some combination may be preferred, where, for example, the intermediate shape is too large for the diameter of the die blank, or where the back extraction of the billet stub is desired, or where the geometry of the final shape dictates.

Billets can be made cylindrical, prismatical, or any convenient shape, but commercial practice is to use billets with a standard circular or rectangular or other compact cross-section to reduce the complexity of the pressure chamber and to reduce billet production costs.

Many different angular shapes can successfully be produced by the present invention. According to the invention, the intermediate shape approximates each of these final shapes in general profile but is generally thicker and of greater cross-sectional area.

In carrying out a preferred embodiment of the procedure of the invention, a semi-crystalline polymer billet is placed in a pressure chamber and is forced from the pressure chamber through a die according to the invention at the end of the chamber. The polymer passes through the die at a temperature ranging between about 0.5 to 0.95 of the melting point expressed in degrees Celsius of the polymer.

The present invention is generally applicable to thermoplastic polymers in which orientation of the molecules can be induced by solid state deformation. This process is particularly useful for producing solid state extrusions of semi-crystalline polymers that allow themselves to be highly oriented at high deformation ratios to produce structural profiles with increased stiffness and strength. Substantially linear polymers are preferred, i.e. polymers in which chain branching occurs in less than 1 per 1,000 polymer units. Polyethylene, polypropylene and polyesters are particularly suitable for use with the invention, but other thermoplastic polymers can also be treated in a very satisfactory manner. Examples of such polymers include polypropylene, polyethylene, polymethylpentane, polytetrafluorethylene, e.g., TEFLON ®, polyamides such as NYLON ®, polyesters such as polyethylene terephthalates (DACRON ®, TERYLENE ®), polyethylene oxide, polyoxymethylene, liquid crystal polymers such as VECTRA ®, etc.

In a preferred embodiment the present invention is used in a solid state extrusion process or other solid state deformation process to produce oriented polymer profiles with tensile strength and modulus greater than that of the starting material (preferably about 5-30 times greater than that of the starting material), while producing profiles of cross-sectional areas greater than 0.5 cm$^2$ at high extrusion rates above 50 cm /min, or more preferably for the production of profiles with cross-sectional areas greater than 1 cm$^2$ at production rates greater than 1m /min. This process includes the steps of providing a deformation area, such as a die, for producing a polymer profile, heating the polymer shape to a temperature below the melting point of the polymer, and heating the deformation area, such as a die, to a temperature at least about as high as the temperature of the polymer shape. The polymer shape is deformed, as by extrusion through a pressure chamber and deformation area, such as a die, at a rate greater than 50 cm/min. and a deformation ratio of greater than 5. A haul-off stress is applied to the oriented polymer profile between at least 0.5 MPa and a maximum amount without plastically deforming the profile as it leaves the deformation area.

Most preferably, a semi-crystalline polymer shape is placed in a pressure chamber and is forced by a ram from the pressure chamber through a die at the end of the chamber. The polymer passes through the die at a temperature ranging between as much as 30° C. below the alpha-crystalline temperature and the melting point of the polymer, forming an oriented polymer profile. According to the invention, the billet in the pressure chamber is maintained at a temperature about 0.50-0.95 times the melting point of the polymer in degrees Celsius. That is, for a polymer having a melting point of 130° C., the pressure chamber is maintained at about 65° to 124° C. The die is heated to above 0.50 times the melting point of the polymer, or preferably above 0.65 times the melting point of the polymer. Most preferably the die is about 0.65-1.2 times the melting point of the polymer, with the die being at least 5° C. warmer than the polymer. The haul off stress on the extrudate or deformed polymer is maintained between at least 0.5 MPa and the maximum amount possible without plastic deformation. These and other temperatures used herein refer to the temperature of the pressure chamber and the temperature of the die themselves. These temperatures do not take into account the internal increases in temperature that may be caused within the polymer shape as a result of deformation forces upon it. Using these procedures a highly oriented profile may be produced having a cross-sectional area of greater than 0.5 cm$^2$ at a production (extrusion) rate greater that 50 cm/min., e.g., 200 to 500 cm/min. at high deformation ratios. The invention is particularly advantageous when used for the production of profiles with cross-sectional areas greater than 1 cm$^2$ at production rates greater than 100 cm/min.

BRIEF DESCRIPTION OF THE DRAWINGS

Other advantages of the present invention will be apparent from the following detailed description of the invention by reference to the drawings wherein like reference numbers refer to like elements in the several figures in which:

FIG. 5a is an end elevation of a further die second stage inlet;

FIG. 5b is a plan view of a further die second stage;

FIG. 5c is an end elevation of a further die second stage outlet end;

FIG. 6a is an end elevation of an inlet of a further die first stage;

FIG. 6b is a plan view of a further die first stage;

FIG. 6c is an end elevation of a further die first stage outlet end;

FIG. 7a is an end elevation of a further die second stage inlet;

FIG. 7b is a plan view of a further die second stage;

FIG. 7c is an end elevation of a further die second stage outlet;

FIG. 8 is a schematic illustration of a two stage extrusion of a rectangular bar using a constant arm length die;

FIG. 9 is a schematic illustration of a two stage extrusion of a rectangular bar using a constant aspect ratio die;

DESCRIPTION OF THE PREFERRED EMBODIMENTS

Figure 1:
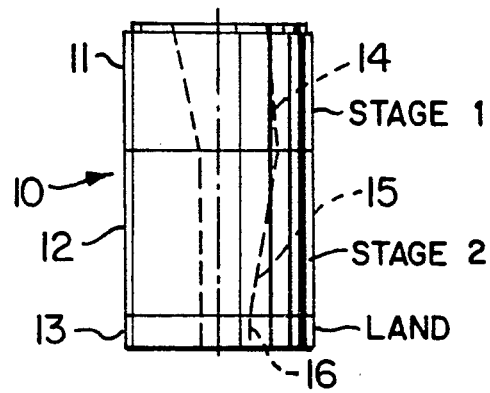
FIG. 1 is a plan view of an assembled die according to the invention.
Figure 2A:
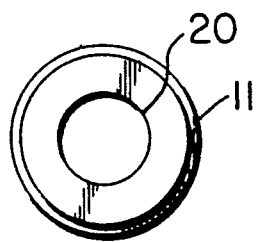
FIG. 2a is an inlet and elevation of the die first stage.
Figure 2B:
FIG. 2b is a plan view of the die first stage.
Figure 2C:
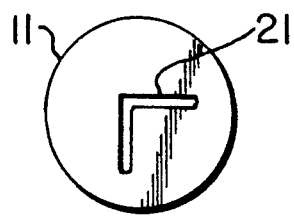
FIG. 2c is an end elevation of the outlet and of the first die stage.

The first embodiment of the die of the invention, referred to as the Constant Aspect Ratio die, is shown in FIGS. 1, 2 and 3. Thus, the die 10 includes a first stage 11, a second stage 12 and a die land 13. The first stage 11 has a circular inlet 20 and an angular outlet 21. The interior profile 14 gradually changes from the shape 20 of FIG. 2a to the shape 21 of FIG. 2c. The transformation through the first stage is at a draw ratio of about 5 thereby producing from an initial 76 mm diameter ingot an intermediate shape shown in FIG. 2c in which the arms of the angle have a length of 64 mm and a thickness of 7.8 mm.

Figure 3A:
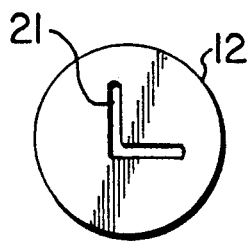
FIG. 3a is an end elevation of the second stage die inlet.
Figure 3B:
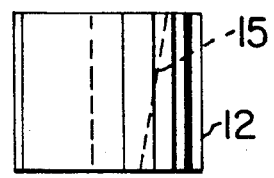
FIG. 3b is a plan view of the die second stage.
Figure 3C:
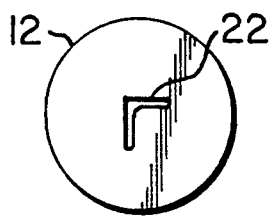
FIG. 3c is an end elevation of the die second stage outlet end.

In the second stage, as shown in FIGS. 3a to 3c, the interior profile 15 is in the form of a constantly reducing thickness and angular arm length with a converging semi-angle of 5.8°. In this second stage the profile is reduced to an arm length of 38 mm and a thickness of 4.6 mm, thereby providing a draw ratio of about 3. A constant aspect ratio was maintained in the second stage in that the ratio of the shaped profile length to thickness remained constant.

Figure 4A:
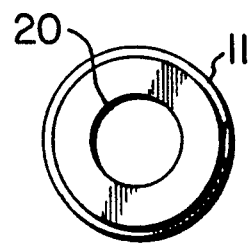
FIG. 4a is an end elevation of a further die first stage inlet.
Figure 4B:
FIG. 4b is a plan view of a further die first stage.
Figure 4C:
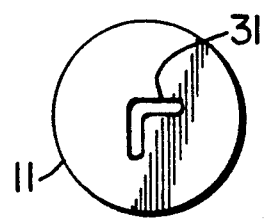
FIG. 4c is a plan view of a further die first stage.

In FIGS. 4 and 5, an alternative embodiment, referred to as the Balanced Draw Ratio die, is shown. Here the first stage interior profile is shown by numeral 30, the intermediate shape is shown by numeral 31, the second stage interior profile is shown by numeral 32 and the final profile shape is shown by numeral 33. The majority of the transverse flow occurs in the first stage at a draw ratio of about 5. The intermediate shape 31 is selected such that the rate of reduction of polymer is balanced. Since the final shape 33 is fixed, the intermediate shape 31 is determined by balancing the regional draw ratios.

The position of the intermediate shape 31 is such that the polymer in the first stage being formed into the inner corner of the intermediate shape 31 encounters a reduced angle compared to what it would be if the shape area centroid were aligned with the extrusion axis. The intent is to reduce the microcracking damage induced in this region during the first stage. The position of the final shape 33 is such that the geometric mid-plane of the final and intermediate shapes are coincident. This results in a more balanced plug flow, reducing transverse shear strains.

Another embodiment, referred to as the Constant Arm Length die, is shown in FIGS. 6 and 7. Here the first stage interior profile is shown by numeral 40, the intermediate shape is shown by numeral 41, the second stage interior profile is shown by numeral 42 and the final profile shape is shown by numeral 43.

In the first stage, the cylindrical billet is converted into an angular intermediate shape 41 with quite thick arms, at a draw ratio of about 5. In the second stage, the intermediate shape 41 is converted into the final angular shape 43, with the arm length of the final shape being the same as that of the intermediate shape.

Figure 10:
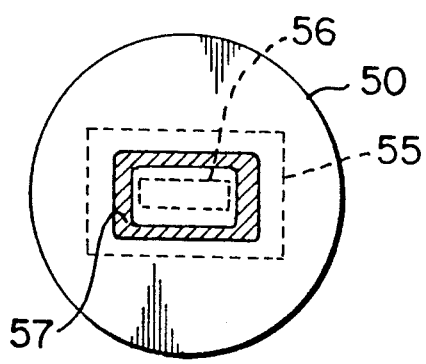
FIG. 10 is schematic illustration of a two stage extrusion of a hollow rectangular profile.
Figure 11:
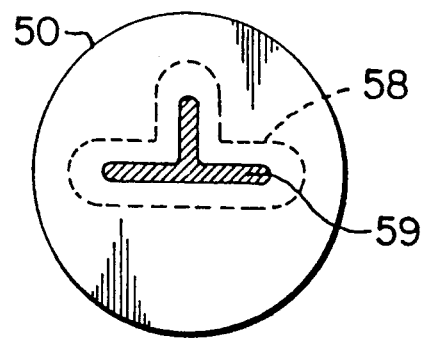
FIG. 11 is schematic illustration of a two stage extrusion of a T-shape profile.
Figure 12:
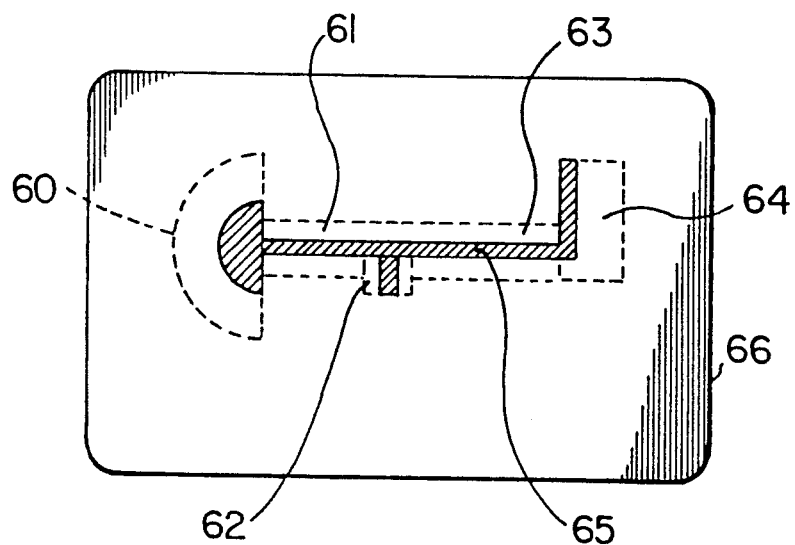
FIG. 12 is a schematic illustration of a two stage extrusion of an irregular profile.

FIGS. 8-11 show five additional configurations of profiles that can be produced according to the invention. In each Figure, the numeral 50 represents the shape of the initial billet, the dotted line represents the intermediate shape and the inner solid line represents the final shape. FIG. 8 shows a constant arm length die in which the intermediate shape is a thick rectangular 51 and the final shape is a thin rectangular 52 of the same width. In FIG. 9, the intermediate shape is a large rectangular 53 and the final shape is a proportionately smaller rectangle 54. FIG. 10 shows a hollow rectangular profile having an intermediate shape shown by the dotted lines 55 and 56 and a final shape 57. FIG. 11 shows a T-section having an intermediate shape 58 and a final shape 59. FIG. 12 starts from a rectangular billet 66, which is extruded into a complex shape, including a rounded end portion 60, a first straight portion 61, a downward projection 62, a second straight portion 63 and an upward extending arm 64. This is compressed proportionately to the final shape 65, by a balanced draw ratio die. Thus, in each section 60-64 the draw ratio (i.e., the deformation ratio) is balanced in going from the intermediate shape to the final shape so that there is little transverse shear.

Figure 13:
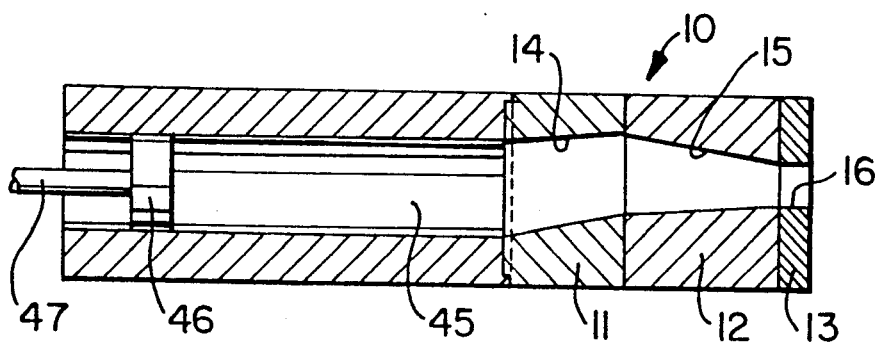
FIG. 13 is a sectional view of an extrusion chamber and die according to the invention.

The die of FIGS. 1 to 3 connected to a ram extruder is shown in FIG. 13. Thus, the ram extruder includes a pressure chamber 45 into which extends a ram 46 driven by an hydraulic cylinder 47. The pressure chamber 45 directly flow connects to die 10.

Other preferred embodiments of the invention are illustrated by the following non-limiting examples:

EXAMPLE 1

A ram extruder of the general type shown in FIG. 13 was used for carrying out tests with two different die configurations. Both dies produced L-shaped profiles 5.0×5.0×0.6 cm thick starting from 10 cm diameter cylindrical billets. The first die (Die A) was a conventional one-stage conical die, while the second die (Die B) was a two-stage Constant Aspect Ratio die of the type shown in FIGS. 1 to 3 herein.

For carrying out the tests, the materials and operating conditions were as follows:

| Material: | DuPont 2909 high density polyethylene |
| --- | --- |
| Extrusion Speed: | 1.2 m/min |
| Billet Dimensions: | cylindrical, 10 cm diam. × 35 cm long |
| Billet Temperature: | 120° C. |
| Die Temperature: | 140° C. |
| Haul-off Tension: | 480 kg |
| Die length: | 23 cm |
| Die land length: | 2.5 cm |
| Total draw ratio: | 14 |

Figure 14:
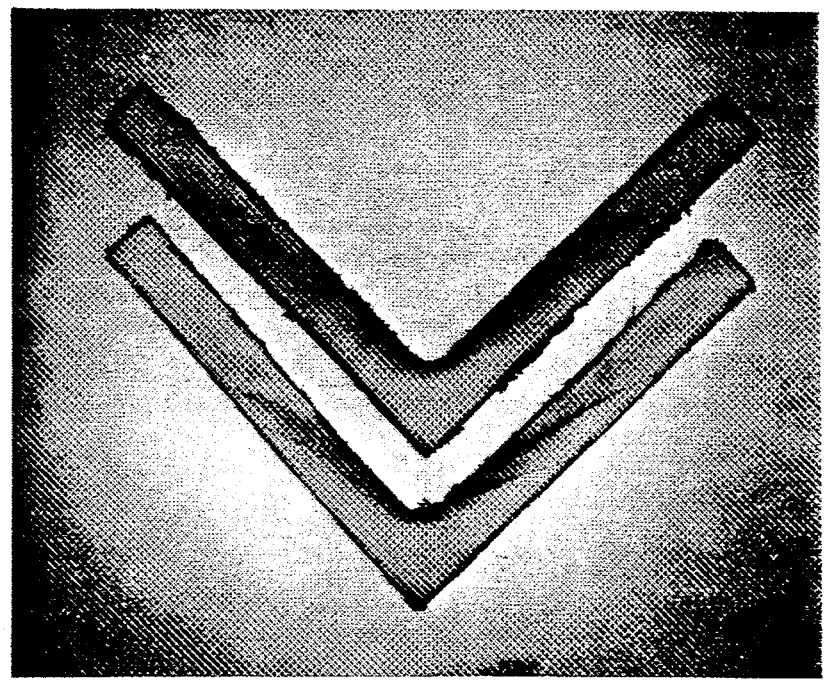
FIGS. 14, 15 and 16 are photographs of sections through L-shaped profiles.

The conventional die (Die A) produced profiles always having numerous cracks radiating from the vicinity of the interior angle. These can be seen in the upper profile shown in FIG. 14. Such cracks lead to premature failure on loading.

For the second test (Die B), a Constant Aspect Ratio die was used similar to that illustrated in FIGS. 1 to 3. The first state had a draw ratio of about 5, leading to an intermediate shape that had the same aspect ratio as the final profile. The lower profile illustrated in FIG. 14 was produced according to this technique and it will be seem that it did not contain cracks and was structurally sound.

EXAMPLE 2

Again, a conventional conical die was compared with a die according to the present invention. Both dies produced profiles 3.8×3.8×0.45 cm thick. However, one was a conventional conical die (Die C), while the other (Die D) was a two-stage Balanced Draw Ratio die such as that illustrated in FIGS. 4 and 5.

The materials used and processing conditions are shown below:

| Material: | DuPont 2909 high density polyethylene |
| --- | --- |
| Extrusion Speed: | 2.0 m/min |
| Billet Dimensions: | cylindrical, 7.6 cm diam. × 35 cm long |
| Billet Temperature: | 100° C. |
| Die Temperature: | 110° C. |
| Haul-off Tension: | 90 kg |
| Die length: | 23 cm |
| Die land length: | 2.5 cm |
| Total draw ratio: | 13 |

Figure 15:
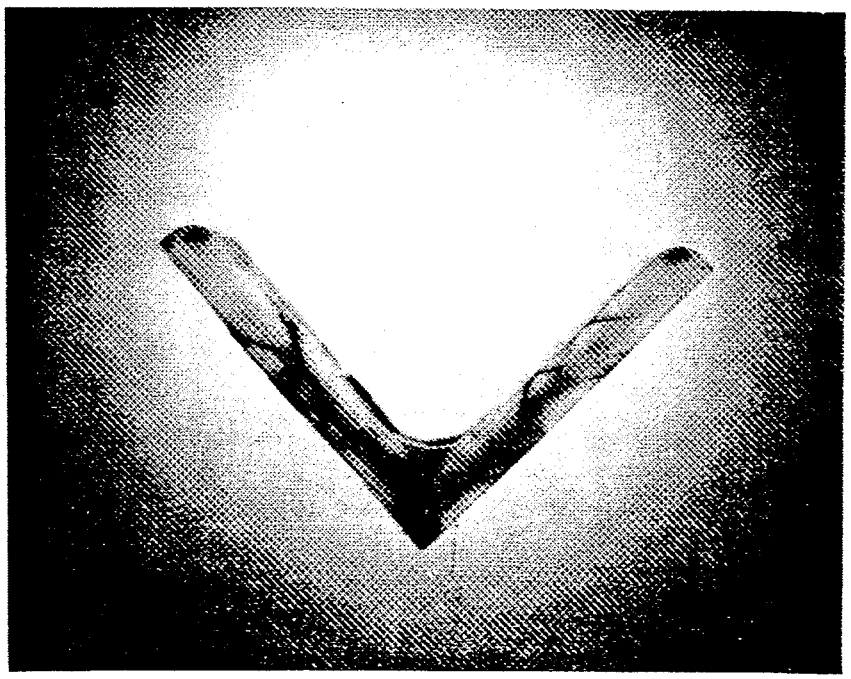

Profiles produced using Die C always had numerous cracks to the cross-section as shown in FIG. 15. Sections 5 cm long cut from the extruded profile withstood a compressive load of 45.1 kg (average of 6 specimens) before collapsing.

Figure 16:
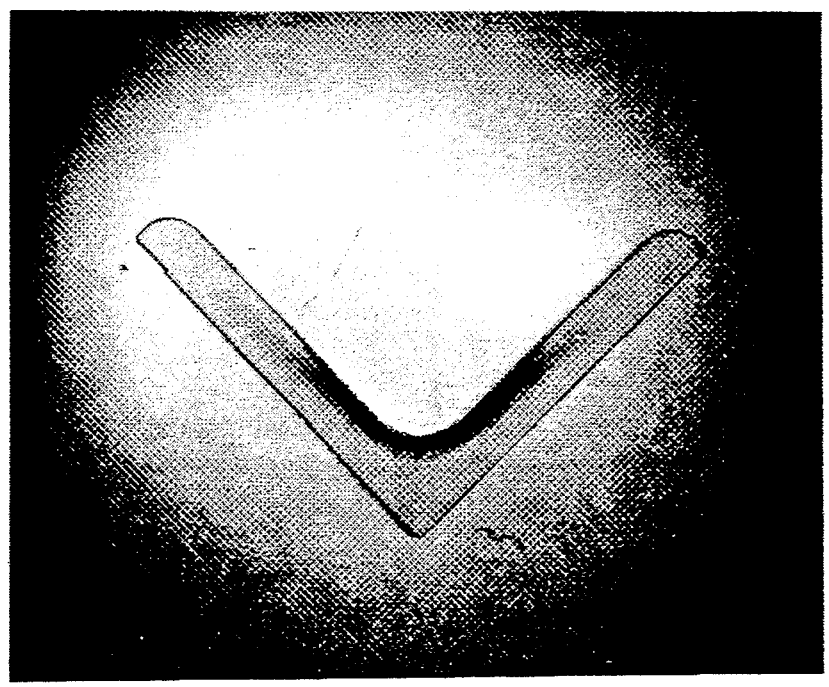

Profiles produced using Die D, as shown in FIG. 16, did not contain any cracks. Sections 5 cm long cut from the extruded profile withstood a compressive load of 80.7 kg (average of 6 specimens) before collapsing. The much higher load bearing capacity of extruded profiles from the Balanced Draw Ratio die of this invention is due to the absence of cracks and weak planes.

What is claimed is:

1. A multistage process for solid state deforming a semi-crystalline thermoplastic polymer from a first shape having a spherulitic morphology to a longitudinally oriented angular shape, comprising the steps of:
    deforming the first shape to provide transverse flow of the polymer while the morphology of the polymer is still spherulitic and to create an intermediate shape; and
    deforming the intermediate shape to induce longitudinal orientation in the polymer and form the angular shape.

2. A multistage process for solid state deformation of a thermoplastic polymer having a compact profile shape into an angular profile shape comprising the steps of:
    selecting a thermoplastic polymer formed into a compact profile shape;
    deforming the polymer in at least two longitudinal stages, each having a deformation axis and deformation length;
    deforming the compact shape in the first deformation stage into an intermediate profile shape that is proportional to the angular shape but greater in cross-sectional area than the angular shape;
    controlling the deformation in the first stage so that flow of polymer across radial planes containing the deformation axis approaches essentially a practical maximum;
    deforming the intermediate shape in the second stage into the angular profile shape; and
    controlling the deformation in the second stage so that the flow of polymer across radial planes containing the deformation axis approaches essentially a practical minimum.

3. The process of claim 2 in which the two stages are at separated locations.

4. The process of claim 2 in which the cross-sectional area of the angular shape is greater than 1 cm.

5. The process of claim 4 in which the deformation rate is greater than 0.5 m/min.

6. The process of claim 5 in which the thermoplastic polymer is semi-crystalline and is heated during both the first and second stages to a temperature that is at least about 0.5 times the melting point of the polymer in degrees Celsius.

7. The process of claim 2 in which the intermediate shape is changed to the angular shape at a constant aspect ratio.

8. The process of claim 2 in which the intermediate shape is changed to the angular shape at a balanced die ratio.

9. The process of claim 2 in which the intermediate shape is changed to the angular shape at a constant profile arm length.

10. The process of claim 2 in which the deforming steps of the first stage and the second stage include extrusion through a heated die.

11. The process of claim 2 in which the deforming steps of the first stage and the second stage include rolling.

12. The process of claim 2 in which the deforming steps of the first and the second stage include drawing.

13. The process of claim 2 in which the polymer is a semi-crystalline polymer that may be highly oriented by deformation.

14. The process of claim 13 in which the polymer is polyethylene.

15. A multi-stage process for solid state deformation of a rigid thermoplastic polymer having a compact profile shape into an angular profile shape comprising the steps of:
    selecting a rigid thermoplastic polymer formed into a compact profile shape;
    deforming the polymer in at least two longitudinal stages, each having a deformation axis and a deformation length;
    deforming the compact shape in a first stage into an intermediate profile shape that is proportional to, but greater in cross-sectional area than, the angular shape;
    controlling the deformation in the first stage so that a majority of the flow of polymer across radial planes containing the deformation axis occurs in the first stage;
    deforming the intermediate shape in a second stage into the angular profile; and
    controlling the deformation in the second stage so that a majority of longitudinal orientation of the polymer takes place in the second stage.

16. The process of claim 15 in which the deformation ratio in the first stage is between 0.5 and 15 and the deformation ratio in the second stage is between 2 and 30, and the deformation ratio in the second stage is greater than the deformation ratio in the first stage.

17. A multi-stage process for solid state deformation of a thermoplastic polymer having a compact profile shape into an angular profile shape comprising the steps of:
    selecting a thermoplastic polymer formed into a compact profile shape;
    deforming the polymer in at least two longitudinal stages, each having a deformation axis and a deformation length;
    deforming the compact shape in the first stage into an intermediate profile shape that is proportional to, but greater in cross-sectional area than, the angular shape, and
    controlling the deformation in the first and second stages so that a majority of the flow of polymer across radial planes containing the deformation axis occurs in the first stage.

18. The process of claim 17 comprising the additional step of controlling the deformation in the first and second stages so that a majority of longitudinal orientation of the polymer takes place in the second stage.

19. A multi-stage process for solid state deformation of a thermoplastic polymer having a compact profile shape into an angular profile shape comprising the steps of:
    selecting a thermoplastic polymer formed into a compact profile shape;
    deforming the polymer in at least two longitudinal stages, each having a deformation axis and a deformation length;
    deforming the compact shape in the first stage into an intermediate profile shape that is proportional to, but greater in cross-sectional area than, the angular shape; and
    controlling the deformation in the first and second stages so that a majority of longitudinal orientation of the polymer takes place in the second stage.

20. A process for solid state deformation of a thermoplastic polymer having a compact profile shape into an angular profile shape comprising the steps of:
    selecting a thermoplastic formed into a compact polymer shape;
    deforming the compact shape into the angular shape; and
    controlling the deformation so that a majority of the flow of polymer across radial planes containing the deformation axis occurs before a majority of the longitudinal orientation occurs.

21. A process for solid state deformation of thermoplastic polymer having a compact profile shape into an angular profile shape comprising the steps of;
    selecting thermoplastic formed into a compact polymer shape;
    deforming the compact shape into the angular shape; and
    controlling the deformation so that the flow of polymer across radial planes containing the deformation axis approaches essentially a practical maximum before the polymer profile has reached an intermediate shape that is proportional to the angular shape but greater in cross-sectional area than the final shape.

22. A process for solid state deformation of a thermoplastic polymer having a compact profile shape into an angular profile shape comprising the steps of:
    selecting thermoplastic formed into a compact polymer shape;
    deforming the compact shape into the angular shape; and
    controlling the deformation so that flow of polymer across radial planes containing the deformation axis approaches essentially a practical minimum after the polymer has reached an intermediate profile shape that is proportional to the angular shape but greater in cross-sectional area than the final shape.

23. A process for solid state deformation of a thermoplastic polymer having a compact profile shape into an angular profile shape comprising the steps of:
    selecting thermoplastic formed into a compact polymer shape;

deforming the compact shape into the angular shape; and controlling the deformation so that the amount of flow of polymer across radial planes containing the deformation axis after longitudinal orientation is below the amount of such flow that causes weak planes in an angular shape extruded by a conical die of the same length.

24. A process for solid state deformation of a thermoplastic polymer having a compact profile shape into an angular profile shape comprising the steps of;

selecting thermoplastic polymer formed into a compact polymer shape;

deforming the compact shape into the angular shape; and controlling the deformation so that flow of polymer across radial planes containing the deformation axis in at least a portion of the polymer approaches essentially a practical minimum and weak planes caused by such flow in that portion of the polymer when extruded by a conical die of the same length are thereby reduced.

25. A process for solid stage deformation of a thermoplastic polymer having a compact profile shape into an angular profile shape comprising the steps of:

selecting thermoplastic polymer formed into a compact polymer shape;

deforming the compact shape into the angular shape; and controlling the deformation so that the flow of polymer across radial planes containing the deformation axis approaches a practical maximum before the polymer reaches an intermediate profile shape that is proportional to the angular shape but greater in cross-sectional area than the final shape.

26. A process for solid state extrusion of a thermoplastic polymer billet having a compact polymer profile and changing cross-sectional shape through a multi-stage die having at least two stages to form a final angular shape, in which process lateral shear deformation is required to change the compact profile to the final profile, comprising the steps of:

extruding the compact polymer profile through a first stage die having an interior contour shaped to impart more lateral shear deformation to the compact polymer profile than occurs in a second stage die, with the intermediate polymer profile being proportional in shape to but greater in cross-sectional area than the final angular polymer profile.

27. The process of claim 26 in which the process includes the step of extruding the intermediate polymer profile through the second stage die having an interior contour shaped to impart more longitudinal orientation to the intermediate polymer than occurs in the first stage to form the desired final angular polymer profile.

28. In a process for solid state deformation of thermoplastic rigid polymers into a final angular shape without weak planes or cracks, the steps of:

providing a thermoplastic polymer profile having a cross-sectional shape that is proportional in shape to, but greater in cross-sectional area than, the final angular shape; and deforming said cross-sectional shape into the desired final angular shape by imparting substantial longitudinal orientation to said cross-sectional shape without substantial lateral shear deformation to transform the profile to the desired final angular shape without creation of weak planes or cracks in the final shape.

29. A multi-stage process for solid state deformation of a thermoplastic polymer having a compact profile shape into an angular profile shape comprising the steps of:

selecting a thermoplastic polymer formed into a compact profile shape;

deforming the polymer in at least two longitudinal stages, each having a deformation axis and a deformation length;

deforming the compact shape in the first stage into an intermediate profile shape that is proportional to, but greater in cross-sectional area than, the angular shape;

controlling the deformation in the first stage so that the flow of polymer across radial planes containing the deformation axis is greater than would occur in the corresponding length of a conical die having an extrusion length equal to the sum of the deformation lengths of the first and second stages;

deforming the intermediate shape in a second stage into the angular profile; and controlling the deformation in the second stage so that the flow of polymer across radial planes containing the extrusion axis is less than would occur in the corresponding length of a conical die having an extrusion length equal to the sum of the deformation lengths of the first and second stages.

30. A multi-stage process for solid state deformation of a thermoplastic polymer having a compact profile shape into a angular profile shape comprising the steps of:

selecting a thermoplastic polymer formed into a compact profile shape;

deforming the polymer in at least two longitudinal stages, each having a deformation axis and a deformation length;

deforming the compact shape in the first stage into an intermediate profile shape that is proportional to, but greater in cross-sectional area than, the angular shape;

controlling the deformation in the first stage so that the change in radius of the shape per unit length along the deformation axis is greater than the change per unit length along the deformation axis in a conical die having an extrusion length equal to the deformation lengths of the first and second stages;

deforming the intermediate shape in a second stage into the angular profile; and controlling the deformation in the second stage so that the change in radius of the shape per unit length along the deformation axis is less than the change per unit length along the deformation axis in a conical die having an extrusion length equal to the deformation lengths of the first and second stages.

31. A process for solid state deformation of a thermoplastic polymer having a compact profile shape into an angular profile shape comprising the steps of:

selecting thermoplastic polymer formed into a compact polymer shape;

deforming the compact shape into the angular shape; and controlling the deformation so that flow of longitudinally oriented polymer across radial planes is reduced relative to the flow that occurs in a conical die of the same deformation length.

32. The process of claim 1, wherein the oriented angular shape is deformed at a rate greater than 50 cm/min. and has a cross-sectional area greater than 0.5 cm$^2$.

33. The process of claim 2, wherein the angular profile shape is deformed at a rate greater than 50 cm/min. and has a cross-sectional area greater than 0.5 cm$^2$.

34. The process of claim 15, wherein the angular profile shape is deformed at a rate greater than 50 cm/min. and has a cross-sectional area greater than 0.5 cm$^2$.

35. The process of claim 17, wherein the angular profile shape is deformed at a rate greater than 50 cm/min. and has a cross-sectional area greater than 0.5 cm$^2$.

36. The process of claim 19, wherein the angular profile shape is deformed at a rate greater than 50 cm/min. and has a cross-sectional area greater than 0.5 cm$^2$.

37. The process of claim 20, wherein the angular profile shape is deformed at a rate greater than 50 cm/min. and has a cross-sectional area greater than 0.5 cm$^2$.

38. The process of claim 21, wherein the angular profile shape is deformed at a rate greater than 50 cm/min. and has a cross-sectional area greater than 0.5 cm$^2$.

39. The process of claim 22, wherein the angular profile shape is deformed at a rate greater than 50 cm/min. and has a cross-sectional area greater than 0.5 cm$^2$.

40. The process of claim 23, wherein the angular profile shape is deformed at a rate greater than 50 cm/min. and has a cross-sectional area greater than 0.5 cm$^2$.

41. The process of claim 24, wherein the angular profile shape is deformed at a rate greater than 50 cm/min. and has a cross-sectional area greater than 0.5 cm$^2$.

42. The process of claim 25, wherein the angular profile shape is deformed at a rate greater than 50 cm/min. and has a cross-sectional area greater than 0.5 cm$^2$.

43. The process of claim 26, wherein the final angular shape is deformed at a rate greater than 50 cm/min. and has a cross-sectional area greater than 0.5 cm$^2$.

44. The process of claim 28, wherein the final angular shape is deformed at a rate greater than 50 cm/min. and has a cross-sectional area greater than 0.5 cm$^2$.

45. The process of claim 29, wherein the angular profile shape is deformed at a rate greater than 50 cm/min. and has a cross-sectional area greater than 0.5 cm$^2$.

46. The process of claim 30, wherein the angular profile shape is deformed at a rate greater than 50 cm/min. and has a cross-sectional area greater than 0.5 cm$^2$.

47. The process of claim 31, wherein the angular profile shape is deformed at a rate greater than 50 cm/min. and has a cross-sectional area greater than 0.5 cm$^2$.

* * * * *